United States Patent [19]

Jensen

[11] Patent Number: 5,266,251

[45] Date of Patent: Nov. 30, 1993

[54] METHOD FOR THE MANUFACTURE OF A HEAT INSULATING FOAMED PLASTIC MATERIAL AND BLOWING AGENT TO BE USED BY THE METHOD

[75] Inventor: Torben H. Jensen, Højbjerg, Denmark

[73] Assignee: Edulan A/S, Aarhus, Denmark

[21] Appl. No.: 863,292

[22] PCT Filed: Dec. 28, 1990

[86] PCT No.: PCT/DK90/00347

§ 371 Date: Jul. 20, 1992

§ 102(e) Date: Jul. 20, 1992

[87] PCT Pub. No.: WO91/09901

PCT Pub. Date: Jul. 11, 1991

[30] Foreign Application Priority Data

Dec. 29, 1989 [DK] Denmark ............................ 6744/89

[51] Int. Cl.$^5$ ............................................. B29C 67/22
[52] U.S. Cl. ........................................ 264/50; 264/51; 264/DIG. 5; 521/910
[58] Field of Search ................ 521/910; 264/DIG. 5, 264/50, 51, 53, 54; 428/69, 305.5

[56] References Cited

U.S. PATENT DOCUMENTS

| | | | |
|---|---|---|---|
| 3,264,165 | 8/1966 | Stickel | 428/69 |
| 3,936,400 | 2/1976 | Wambach | 521/89 |
| 4,443,563 | 4/1984 | Dirlikov et al. | 521/174 |
| 4,728,674 | 3/1988 | Wroczyynski | 521/94 |
| 4,731,389 | 3/1988 | Christopher et al. | 264/DIG. 6 |
| 4,798,753 | 1/1989 | Abuaf et al. | 428/69 |

*Primary Examiner*—Allan R. Kuhns
*Attorney, Agent, or Firm*—Oblon, Spivak, McClelland, Maier & Neustadt

[57] ABSTRACT

Method for the manufacture of a heat insulating foamed plastic material by foaming of a plastic material or plastic precursor material by means of a blowing agent where a mixture of krypton and xenon is at least partially used as a blowing agent. When using a mixture of krypton and xenon as the blowing agent, the ecological damages, particularly to the ozone layer, caused by the conventional CFC gases are avoided while a good heat insulating capacity is obtained at the same time.

4 Claims, No Drawings

METHOD FOR THE MANUFACTURE OF A HEAT INSULATING FOAMED PLASTIC MATERIAL AND BLOWING AGENT TO BE USED BY THE METHOD

TECHNICAL FIELD

The present invention relates to a method for the manufacture of a heat insulating foamed plastic material by foaming of a plastic material or plastic precursor material by means of a blowing agent, a blowing agent to be used by the method, the use of a mixture comprising krypton and xenon as the blowing agent and a heat insulating foamed material prepared according to the method.

BACKGROUND ART

Preparation of heat insulating materials of foamed plastics using blowing agents which provide the material with a gas-filled cell structure is well known in the art. In foamed plastics for insulating purposes the solid phase is often made of polyurethane and the gas phase, that is the blowing agent is chlorofluorocarbons (CFC substances), for instance trichlorofluoromethane (CFC 11). Because of their low thermal conductivity, CFC substances provide foamed plastics suitable for heat insulation. In addition to this, they have a suitably low boiling point, which presents an advantage to the method of preparation, they are chemically inactive to the solid plastic materials of the foamed material and are stable in their environment of use. The use of said CFC substances is however encumbered with the drawback that they are damaging to the environment. In recent years, a potential problem has come to light in that when exposed to ultra-violet rays the otherwise stable CFC substances are decomposed in the upper atmosphere, whereby halogens are released which decompose the ozone layer. Therefore, there is a growing need for alternative insulating materials which do not involve harmfull halogen-containing blowing agents both in order to meet the wishes of environment-conscious consumers and to forestall problems in connection with legal restrictions, prohibitions or increased purification requirements to be expected in the future.

To replace said substances, it has been suggested to use similar substances which in addition to halogen atom(s) contain at least one hydrogen atom, for instance HCFC substances. Said substances distinguish themselves from the traditional CFC substances in that they are less stable and therefore only a smaller quantity is expected to reach the upper atmosphere. The decomposition products of said materials may however be expected to cause other environmental problems, for instance hydrochloric acid rain and hydrofluoric acid rain. Furthermore, it is expected that the preparation of HCFC substances will be substantially more costly than the preparation of CFC substances.

As the cells of the heat insulating foamed plastic materials make up the major portion of the volume, the heat conduction taking place through the gas present in the cavity of the cells contributes considerably to the total thermal conductivity of the insulating material, said contribution conventionally comprising about half of the heat conduction in the case where the cells are filled with CFC 11. Therefore, when preparing a foamed plastic material with a good heat insulating capacity, it is decisive that the gas present in the cells per se have a low thermal conductivity.

BRIEF DESCRIPTION OF THE INVENTION

It is the object of the present invention to provide a method for the preparation of a heat insulating foamed plastic material in which an alternative blowing agent is used, said blowing agent being capable of replacing the environmentally damaging CFC substances conventionally used, whereby an adverse effect on the environment is avoided while still avoiding the danger of fire and discomfort at the preparation and still obtaining the good heat insulating properties.

This object is obtained by a method for the preparation of a heat insulating foamed plastic material by foaming a plastic material or a plastic precursor material by means of a blowing agent, said method being characterised in that at least partially a mixture of krypton and xenon is used as the blowing agent.

The elements krypton and xenon and mixtures thereof are well known, see for instance CRC Handbook of Chemistry and Physics, 70th Edition, 1989-1990, pages B-22, B-41, E-2, E-3 and E-13 to E-16; Kirk Othmer, "Encyclopedia of Chemical Technology", 3rd Edition, 1982, Volume 12, pages 249-255 and 264-268, and Otto-Albrecht Neumüller, "Römpps Chemie-Lexikon", 8th Edition, Volume 3, page 2262 and Volume 6, pages 4658 and 4659. The elements are described as being non-toxic and it appears that they have a low thermal conductivity. It appears from the Tables of the above Handbook that said thermal conductivity is of the same order as the thermal conductivity of trichlorofluorocarbonhydride.

Krypton and xenon might thus be candidates to replace CFC gases. However, a person skilled in the art will find that the market price for krypton and xenon, respectively is per se prohibitive for the use thereof on a large technical scale.

However, the high market prices are dictated by the purity of krypton and xenon, respectively, which is required today for the conventional technical applications. A large proportion of the price is thus due to the difficulties in separating krypton and xenon from each other. As both krypton and xenon have the low thermal conductivity required, there is, however, no need for such costly separation of krypton and xenon. On the contrary, considerable quantities of secondary gases can be tolerated in the mixture used without any appreciable deterioration of the thermal conductivity. Thus, a fraction recovered from atmospheric air with a high content of krypton and xenon may be used directly, for instance the highly concentrated Kr-Xe crudes, described in Kirk-Othmer "Encyclopedia of Chemical Technology", 3rd Edition, 1982, Volume 12, page 267.

The thermal conductivity of a mixture of more gases will usually be lower than the thermal conductivity calculated by interpolation of the thermal conductivity of the individual constituents. This is the reason why the mixture of xenon and krypton used does not need any particularly high degree of purity and this is also the reason why the mixture may advantageously be used in combination with conventional environmentally acceptable blowing agents and still obtain a substantially improved low thermal conductivity compared to said conventional environmentally acceptable blowing agents.

The present invention also provides a blowing agent to be used by the above method, said blowing agent being characterised by containing a mixture of xenon and krypton.

The invention also relates to a heat insulating foamed plastic material comprising gas filled cells confined in a plastic matrix prepared by the method according to the invention.

The advantages of the use of a mixture of krypton and xenon as blowing agent are manifold. They thus have a low thermal conductivity, of the same order as the thermal conductivity of trichlorofluoromethane (CFC 11). Contrary to the CFC substances, krypton and xenon, in the present specification also designated KX-gases, are native materials which are not chemically reactive. Thus, said substances do not cause pollution and they are not inflammable or harmful to human beings or to the environment. Such properties provide great advantages to the production, the use of the foamed materials and the disposal of the materials. The problems associated with the CFC substances in connection with the emission of blowing agents from discarded foamed products do thus not arise. On the contrary, such emission will form part of a natural circle, as the KX-gases are recovered directly from the atmospheric air. The lack of chemical reactivity is further an advantage to the production of foamed plastics as the KX-gases do not affect the plastic material adversely. Finally, it is an advantage that the KX-gases have a low boiling point, thereby not condensing at even extremely low temperatures. Such condensation would reduce the thermal conductivity of the foamed material.

The foamed plastic material may have cells filled with KX-gas alone or with KX-gas in a mixture with other blowing agents. Because of the low thermal conductivity, it will often be an advantage to use KX-gas alone but as the λ-value of a mixture of more gases is usually lower than the thermal conductivity calculated by interpolation, substantial advantages are still obtained by using KX-gases admixed with other blowing agents. KX-gas is thereby saved. In principle, the blowing agent used together with KX-gas may be any known blowing agent and may advantageously be selected among carbondioxide, carbonmonoxide, nitrogen, atmospheric air, argon, volatile hydrocarbons or mixtures thereof.

The plastic matrix forming part of the foamed plastic material may be of any kind of material suitable as plastic foam.

Examples of suitable plastic materials include both thermoset and thermoplastic. Examples of thermoset include polyurethane, polyisocyanurate, unsaturated polyester, including vinyl ester, allyl plastics, phenolic plastics and the like such as types of plastics prepared by condensing formaldehyde with monovalent or polyvalent phenoles or furanoles, amino plastics, including urea-formaldehyde plastics and melamine-formaldehyde plastics, amide plastics, imide plastics, epoxide plastics as well as vulcanized elastomers, for instance natural rubber and ethylene-propylene-terpolymer rubber. Examples of suitable thermoplastics include vinyl plastics, such as polystyrene, polyvinyl chloride and acrylic ester plastics, polyolefins, such as polyethylene and polypropylene, including polyolefins which are crosslinked in connection with or after the foaming, amide plastics, imide plastics, polyurethane, ester plastics, polycarbonate, acetal plastics, polyphenylene oxid, various copolymers such as for instance ABS (acrylate-butadiene-styrene) and thermoplastic elastomers.

Particularly advantageously, the plastic matrix used is polyurethane plastics. Said material is particularly suitable for use when manufacturing heat insulating foamed materials, as polyurethane provides particularly favourable opportunities for tailoring a product by varying the quantity and type of plastic starting materials used.

Krypton and xenon have a thermal conductivity of 9.5 and 5.5 mW/m°K, respectively, which is of the same order as for CFC 11 where it is 8 mW/m°K. It will thus be possible to obtain a heat insulating material with substantially the same good heat insulating properties as when using CFC substances.

The further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

DETAILED DESCRIPTION OF THE INVENTION

The foaming may be carried out by means of prior art known per se for foaming using only gas as blowing agent or gas in a combination with other conventional blowing agents. The apparatus used for the foaming may be any known apparatus for use in such foaming processes.

When preparing the heat insulating foamed plastic material according to the invention, a mixture of krypton and xenon or a mixture of krypton and xenon with one or more known blowing agents, for instance $H_2O$/$CO_2$, HCOOH/CO, argon, nitrogen, oxygen, atmospheric air, volatile hydrocarbons or similar known blowing agents, is used as the blowing agent. In the present specification and claims "KX" or "KX-gas" designate a mixture of krypton and xenon. According to the present invention KX or, if the plastic material used is polyurethane, a combination of KX and $H_2O$/$CO_2$ is preferably used.

If in addition to KX-gas the total blowing agent comprises liquid or solid substances, said substances are added to the plastic material in a conventional manner, that is usually before the addition of the gaseous components of the blowing agent. When using $H_2O$/$CO_2$ as a portion of the blowing agent used for foaming polyurethane, the water is thus added to the polyole component beforehand. In a similar manner, formic acid may be added to the polyole component whereby carbonmonoxide is developed by the reaction with the isocyanate component.

The gaseous component(s) of the blowing agent, that is the KX-gas and possible supplementing gaseous blowing agents, may be added to the plastic raw material by dissolving or dispersing. In case of plastic materials on two-component basis, gaseous blowing agents may be added either to one of the components or both. Dispersion of a gaseous blowing agent may for instance take place by beating or by adding the blowing agent under pressure through a porous material or a combination of both.

The addition of the blowing agent, both by dissolution and by dispersion, must take place under a pressure exceeding the pressure under which the pouring is to take place. Following the addition of the blowing agent or the blowing agents, the raw materials must be kept at a suitably high pressure, thereby preventing the blowing agent from being released prematurely. The additon of the blowing agent may advantageously be carried out in a mixing device in connection with the pouring per se.

The addition of the blowing agent takes place at suitable temperatures depending on the material and equipment used, for instance at a temperature between 10° C. and 70° C.

The amount of gaseous blowing agent used is determined by the required properties of the final heat insulating foam, such as the bulk density of the foam, and by the amount of possibly supplementary blowing agents, for instance $H_2O/CO_2$. The amount of gasous blowing agent to be used when preparing the heat insulating foamed plastic material according to the invention can easily be calculated by a person skilled in the art. When preparing foam having a density of 50 g/l using only KX-gas as blowing agent, about 19 parts by volume KX-gas are used for each part by volume plastic raw material. The above volume is calculated at a pressure of 1 bar. Using such ratio of volume a foamed material is obtained where about 95% of the volume is made up of cells containing blowing agents. The above computations are, however, theoretical, as in practice an adjustment must be made for a loss of blowing agent and the final pressure in the cells which may deviate from 1 bar. Such adjustments must be determined on the basis of simple tests carried out in connection with the production in question.

When using dispersion, it is aimed at obtaining as small bubbles as possible as usually as small cells as possible are desirable in the final foam. To obtain a good thermal conductivity the final foam should have a average cell diameter below 1.5 mm, preferably below 0.5 mm. On the basis of this requirement, the permissible bubble size may be calculated on the basis of such parameters as the dispersion pressure and the pouring pressure used.

The pouring may for instance be carried out in the manner usually known for foaming. As soon as the reaction mixture leaves the mixing device and is thereby subjected to a drop in pressure, the dissolved or dispersed blowing agent causes foaming, as dissolved blowing agent is released and dispersed bubbles are expanding. The heat formed by the reaction between the plastic materials just mixed furthermore accelerates the release and the expansion of the bubbles and thereby supports the formation of foam. If a chemically reacting blowing agent is used supplementarily together with the gasous blowing agent, the development of gas resulting from the chemical reaction takes place simultaneously with or a little after the physically determined foaming. Water admixed with the polyol component of polyurethane may be mentioned as an example of a chemically reacting blowing agent. During the reaction, the water added reacts with the isocyanate component while developing $CO_2$ which contributes to the foaming.

In principle, any type of plastic material suitable for the preparation of foamed plastics may be used as the plastic material forming part of the heat insulating foamed plastic material according to the invention.

The manufacture of a material of plastics is usually carried out through a phase in which the material is sufficiently plastic to be shaped or moulded by means of pouring, injection moulding, compression moulding or the like. Conventional plastic materials are usually divided into the two main groups thermoplastics and thermoset.

Thermoplastics are characterised in that a plastic conditon is obtainable by heating the material. After the moulding. The material has a substantially unchanged chemical structure, whereby it is possible to melt down the materials.

Thermoset is characterised in that the moulding involves a chemical reaction usually implying a crosslinking of the molecular chains in such a manner that the product is not thermoplastic. The raw material for the preparation of thermoset may be present as one or more components which in the condition supplied may be liquid or solid. The setting reaction may be started thermically or chemically. Examples of such setting reactions are described below.

Polyurethane

Polyurethane is prepared by reacting a polyol with an isocyanate whereby among other things urethane bonds are formed between the polyol component and the isocyanate component. The raw material components are supplied in a liquid state and have a good storability, also after the addition of possible auxiliary agents. The two components are usually mixed at room temperature or at a sligtly elevated temperature. The chain length and the degree of crosslinking of the reaction product depend on the number of functional groups of the polyol component and the isocyanate component and of the catalysts used, as well as of temperature and other conditions during the reaction. The mechanical properties of the polyurethane material formed may be controlled within wide limits and it is thus well known to persons skilled in the art how the required foaming conditions and desired properties of the final foamed product are secured through the selection of starting components and reaction conditions. Polyurethane is advantageous in that it is a relatively inexpensive material.

A varity of polyurethane is polyisocyanurate whose chemical structure is characterised by heterocyclic groups. Polyisocyanurate is suitable for foaming and posseses particularly good fireproof properties.

The starting material for the preparation of polyurethane or polyisocyanurate is well known to persons skilled in the art. A non-limiting review of such starting materials is provided in U.S. Pat. No. 4,120,923 and the references given therein.

Polyester Plastics

Polyester plastics may be prepared by reacting unsaturated polyester resins and compounds copolymerizable therewith. Examples include crosslinking of unsaturated oligo esters dissolved in styrene as the copolymerizable material. Said reaction may be carried out by means of a free-radical-reaction, for instance by adding organic peroxides which open double bonds in the ester chains and in styrene. Traditionally such liquid, cold-setting polyesters are used for the preparation of glass fibre reinforced constructions. The material is, however, also suitable for foaming. The range of possible variations of the properties is however far narrower than for polyurethane. Polyesters are also an inexpensive material.

A non-limiting review of examples of unsaturated polyester resins, which together with copolymerizable polyester compounds may be used for the preparation of foamed plastics is given in the above U.S. Pat. No. 4,120,923 and the references given therein.

Phenolic Plastics

Phenolic plastics may be prepared by condensation of phenol with formaldehyde. As plastic raw material a not fully condensated intermediary product is used, the properties of which among other things depend on whether an excess of phenol or of formaldehyde has been used. It is possible to manufacture both liquid and solid phenol plastic raw materials. Curing of a liquid raw material is carried out by acid addition or by heating while solid raw materials, which prior to the final reaction are thermoplastic, are usually moulded by means of hot moulding. Particularly the type of phenol plastics where the raw material is liquid is suitable for foaming. It is also possible to manufacture foamed plastics from phenol plastics by direct reaction between phenol and formaldehyde during the foaming. The possible scope of possiblities is essentially narrower than is the case with polyurethane. However, the price is low and the fireproof properties are extremely good, as phenol plastics is self-extinguishing.

Resorcinol, melamin and urea may also be condensed with formaldehyde to form intermediary products with corresponding possible applications as phenol plastic raw materials. The prices of such materials are, however, higher than those of phenol plastics.

One or more blowing agents may be used for the manufacture of foamed plastics. The effect of a blowing agent is due to the occurence at a suitable time during the processing of the plastic raw material of such physical and/or chemical conditions in the plastic mass that a release of gas takes place in a great number of points evenly distributed over the mass. Said gas release which provides the material with a cell structure, may be based on purely physical conditions or on a chemical reaction.

For purely physical foaming, liquid or gaseous blowing agents are used which are introduced into the plastic mass or one or more of the plastic raw materials beforehand. The physical conditions causing the release of gas and thereby the foaming, is usually a rise in temperature (usually as reaction heat) and/or a drop in pressure but may also be changed solubility conditions because of chemical reactions or the gas release may be caused by the introduction of particle material acting as graft. The KX-gases are included in the blowing agents whose effect is purely physical.

The presence of blowing agents may affect the properties of the solid plastic material by possibly acting as softener. Such effect is usually unfavourable and undesirable. As the KX-gases are chemically inactive, they do not cause such unfavourable effects. The mechanical properties and the dimensions of a foamed material formed may furthermore change over time as the blowing agent evaporates, unless this if prevented by sealing the surface.

Traditionally, a combination of physical foaming by means of CFC 11 with chemical foaming by means of $H_2O$ which has been added to the polyol component and which develops $CO_2$ when reacting with the isocyanate component has been used for polyurethane foam. A corresponding combination where KX-gas is used instead of CFC 11 may advantageously be used. Foaming using only $H_2O/CO_2$ is possible but may have a number of drawbacks.

Within the technique of forming polyurethane foam a pre-foaming technique may be used, where CFC 11 in combination with a blowing agent having a low boiling point, such as CFC 12, nitrogen or $CO_2$, dissolved in the raw materials under pressure is traditionally used. The low-boiling blowing agent forms a pre-foam immediately when the raw material mixture leaves the mixing head, whereupon the reaction heat gradually releases the portion of the blowing agent having a higher boiling point thereby filling the mould or the volume required. KX-gases may also be used in such pre-foaming technique, possibly in combination with other environmentally acceptable blowing agents.

The manufacture of foamed plastics for heat insulating purposes may take place by means of conventional equipment. The equipment used is of course determined by the type of plastic in question.

Polyurethane foam is either manufactured as block foam or by pouring the cavities which it is desired to insulate. In block foaming, which may optionally be arranged as a continuous process, the raw material mixture is introduced by means of a lance (i.e. a lance or spear shaped pole with a nozzle) which is moved according to a fixed pattern. Thereby large foamed blocks are manufactured which are cut out to plates, for instance for use when heat insulating buildings. Direct foaming to fill out cavities is among other things used when manufacturing refrigerators and pipes for district heating. The mixture of the raw materials prior to the pouring takes place in mixing devices according to well known principles. The admixture of a gasous blowing agent for pre-foaming typically takes place by aggitating the raw material while the blowing agent is introduced in the bottom of the container at an overpressure of a few bar.

Important examples of thermoplastics suitable for foaming include polystyrene, polyvinylchloride and polyolefines. At present, polystyrene foam is the most important thermoplastic foam used for heat insulating. More methods are known for the manufacture of polystyrene foam. The two most commonly known methods are 1) expansion of pre-expanded granulate in a mould cavity, and 2) foaming in connection with extrusion. The pre-expanded granulate used for method 1) is manufactured on the basis of polystyrene grains containing a blowing agent rendering possible foaming, that is pre-expansion, of the grain by heating. A known blowing agent is pentan. Later the pre-expanded granulate may be filled in a mould to which steam is led, said steam causing som further expansion and welding of the granulate. In foaming according to method 2), the polystyrene material must contain either a chemical blowing agent which is split at a temperature below the extrusion temperature or a physical blowing agent dissolved under pressure in the melted polystyrene in the extruder. As the melt leaves the extruder, the drop in pressure causes foaming. It appears that in both the foaming methods for polystyrene and corresponding thermoplastics described it is possible in accordance with the present invention wholly or partially to use KX-gas as blowing agent.

In order to assess the heat insulating properties of a foamed plastics the total thermal conductivity $\lambda$ is measured. The conductivity of a foamed plastic material is composed of three contributions to heat conduction:

1) heat conduction through the gas present in the cavities of the cells, 2 ordinary heat conduction through the solid plastic material, and 3) heat radiation.

Theoretically, there is also a contribution from convection in the cells, but as said contribution is substantially lower than the other contributions, when the cells have the usual size, the contribution may be left out in practical calculations. For a traditional polyurethane foam where the cells are filled with CFC 11, the ratio between the other three contributions is conventionally estimated at 2:1:1.

Some $\lambda$-values for different materials are stated below.

| | $\frac{mW}{m^\circ K}$ |
|---|---|
| INSULATING MATERIALS (instructive values) | |
| Mineral wool | 33 |
| Polyurethane foam 50 g/1 prep. with CFC 11 | 17-20 |
| Polyurethane foam 50 g/1 prep. with $H_2O/CO_2$ | 24-30 |
| BLOWING AGENTS etc | |
| (for liquid blowing agents the value for steam applies) | |
| Atmospheric air | 26.2 a) |
| Carbon dioxide | 16.9 a) |
| Helium | 155.9 a) |
| Neon | 49.5 a) |
| Argon | 17.7 a) |
| Krypton | 9.5 a) |
| Xenon | 5.5 a) |
| $CCl_3F$, CFC 11 | 8.0 b) |
| $CHCl_2CF_3$, HCFC 123 | 9.6 b) |
| $CH_3CCl_2F$, HCFC 141 b | 9.4 b) |
| Carbon monoxide | about 25 | a) Rounded off to 1 decimal from values in J. Kestin, W. A. Wakeham: "Transport Properties of Fluids", Hemisphere Publishing Corp., New York etc 1988.
b) Converted from values in K. T. Dishart. J. A. Creazzo, M. R. Ascough, page 59 of the report from "Polyurethanes World Congres 1987", September 29 to October 2, 1987, Aachen.

$\lambda$ for a mixture of two gases does not correspond to the one found by means of a linear interpolation. The resulting $\lambda$-value is thus determined mostly by the one of the gases having the lowest thermal conductivity. This may be utilized in practice if for environmental or economic reasons it is desired to save on a blowing agent with low $\lambda$-value. It is this well known that polyurethane foam with CFC 11 still has an acceptably low $\lambda$-value, even with a considerable $CO_2$ content. $CO_2$ may also be combined with KX-gases.

From the above it will be understood that it is not necessary for the KX-gas used to have a particularly high degree of purity. Therefore it is possible to manufacture KX-gas at a technically acceptable price on the basis of atmospheric air, although the content in atmospheric air is only 10. $8 \times 10^{-5}$ volume% krypton and $0.8 \times 10^{-5}$ volume% xenon. As according to the invention the heat insulating material for instance can be used for insulation of pipes for district heating, it may be assumed that a large demand for KX-gases will arise which in its turn will be an incentive for developing more inexpensive methods for isolating KX-gases from the atmospheric air.

As xenon is the one of the KX-gases having the lowest thermal conductivity, it may also be imagined that KX-gas mixtures having a higher content of xenon than the one corresponding to a volume ratio between krypton and xenon of 27:2, corresponding to the ratio of atmospheric air, may advantageously be used. Thus also other sources, especially more xenon containing sources than atmospheric air may become relevant.

The fraction of closed cells in the foam is decisive to the heat insulating benefit of a blowing agent. For polyurethane foam (excluding integral foam) about 85% closed cells are usually obtained. The other cells are connected to the surface of the foam and if the surface is not sealed, said cells provide access to atmospheric air having a high $\lambda$-value.

Sealing is thus an important factor to the maintenance of the heat insulating effect of the closed cells as diffusion in and out through the cell walls can never be entirely avoided. This problem is especially known from polyurethane foam containing $CO_2$, which has a poorer insulating capacity than CFC 11 but better than atmospheric air. Thus in unsealed foam $CO_2$ is rather quickly replaced by atmospheric air, whereby the $\lambda$-value of the foam rises. The rate of diffusion for blowing agent through plastic matrix is ususally accelerated if a chemically conditioned absorption takes place. Thus, is is also an advantage in this case that the KX-gases are chemically inert.

Problems with the sealing do, however, not occur during all foaming processes. Where the foaming takes place during the filling of a cavity, for instance when manufacturing a mantle for a refrigerator or a pipe for district heating, a sealing of the plastic material per se is often formed by itself during the curing or hardening against the wall of the filled cavity or the cavity forms a sealing per se.

In the below Examples 1-4 the process according to the invention is illustrated by means of tests on a laboratory scale. When the process according to the invention is scaled up to industrial scales, a static long-term gasification of the raw materials cannot be used and insted a process based on aggitation and introduction of bubbles which must still take place under a suitable pressure.

EXAMPLE 1

The present Example illustrates the manufacture of polyurethane foam on a laboratory scale by foaming with KX-gas. The KX-gas used contains krypton and xenon in a volume ratio of about 27:2.

A polyol mixture having the following composition is prepared:

| | |
|---|---|
| CARADOL TM 555-1 | 100 g |
| DIME TM 6 | 1 g |
| TEGOSTAB TM B8404 | 1 g |
| Waterfree glycerol | 3 g |

CARADOL TM is a polyol component available from Shell. DIME TM 6 is a catalyst in the form of N,N-dimethylcyclohexylamine, available from Shell. TEGOSTAB is a trademark not registred in Denmark for a foam control agent available from Th. Goldschmidt AG, Essen.

200 g of the above mixture is placed in a calorimeter bomb and a KX-gas pressure of 10 bar is applied for 96 hours at 20°. 350 g isocyanate component (CARADATE TM 30, available from Shell) is treated in the same manner. After quickly mixing the two components treated with KX-gas, 500 g of the mixture formed are poured into a 4 liter box-shaped aluminium mould, which is immediately closed with a lid. After foaming and cooling, the material is taken out of the mould. The A-value of the material and compressive strength parallel to the direction of inclination are measured and the material is further analysed to determine density and the ratio of closed cells.

EXAMPLE 2

Foaming of polyurethane in laboratory test using the KX-gas used in Example 1 in combination with $H_2O/CO_2$ as blowing agent.

A polyol mixture having the following composition is prepared:

| CARADOL TM 555-1 | 100 g |
|---|---|
| DIME TM 6 | 1 g |
| TEGOSTAB B8404 | 1 g |
| Water | 1 g |

200 g of the above mixture is treated in a calorimeter bomb to absorb KX-gas in the same manner as in Example 1. 350 g isocyanate component (CARADATE TM 30) is treated in the same way. The components are quickly mixed and 500 g of the mixture is poured into a 4 liter box-shaped aluminum mould which is immediately closed with a lid. After foaming and cooling the material is taken out of the mould and the material is analysed in the same manner as described in Example 1.

EXAMPLE 3

The present example illustrates free foaming of polyurethane using the KX-gas used in Example 1 as blowing agent in a laboratory test.

The test is carried out in the same manner as in Example 1 apart from 100 g of the mixture of components being poured into a 1 liter open plastic cup for free foaming. In the test, cream time, rising time and non-adhesive time are determined.

EXAMPLE 4

The present example illustrated the manufacture of polyurethane foam during free foaming with the KX-gas used in Example 1 in combination with $H_2O/CO_2$ on a laboratory scale.

The procedure is as described in Example 3 apart from using the raw materials stated in Example 2.

BEST MODE FOR CARRYING OUT THE INVENTION

The embodiment of the invention best known at present is the manufacture of heat insulating foamed plastic material in the form of foamed polyurethane.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for manufacturing a heat insulating foamed plastic material, comprising:
   foaming a plastic material or a plastic precursor material with a blowing agent consisting essentially of (1) a mixture of krypton and xenon or (2) a mixture of krypton and xenon which is combined with non-CFC blowing agents during manufacturing of said heat insulating foamed material, the mixture of krypton and xenon being present in an amount sufficient to provide an improved heat insulating effect compared to a heat insulating effect capable of being provided by other CFC-free blowing agents.

2. The method of claim 1, wherein said blowing agent consists essentially of said mixture of krypton and xenon and a non CFC blowing agent.

3. The method of claim 1, wherein said plastic material or said plastic precursor material is a member selected from the group consisting of polyurethanes, polyisocyanurates, unsaturated polyesters, allyl plastics, phenolic plastics, amino plastics, amide plastics, imide plastics, epoxide plastics, elastomers, vinyl plastics, polyolefins, ester plastics, polycarbonates, acetal plastics, polyphenylene oxide and ABS plastics.

4. The method of claim 3, wherein said plastic precursor material is a precursor of a polyurethane plastic.

* * * * *